US 11,391,850 B1

(12) United States Patent
Xie et al.

(10) Patent No.: US 11,391,850 B1
(45) Date of Patent: Jul. 19, 2022

(54) BEIDOU NAVIGATION SATELLITE B1C SIGNAL CAPTURING METHOD, AND RELATED APPARATUS

(71) Applicants: Guangdong University of Technology, Guangdong (CN); Russian Academy of Engineering, Moscow (RU)

(72) Inventors: Shengli Xie, Guangdong (CN); Xiaobo Gu, Guangdong (CN); Kan Xie, Guangdong (CN); Guoxu Zhou, Guangdong (CN); Haochuan Zhang, Guangdong (CN); Victor Fedorovich Kuzin, Moscow (RU)

(73) Assignees: Guangdong University of Technology, Guangzhou (CN); Russian Academy of Engineering, Moscow (RU)

( * ) Notice: Subject to any disclaimer, the term of this patent is extended or adjusted under 35 U.S.C. 154(b) by 0 days.

(21) Appl. No.: 17/585,595

(22) Filed: Jan. 27, 2022

(30) Foreign Application Priority Data

Aug. 31, 2021 (CN) .......................... 202111017107.3

(51) Int. Cl.
*G01S 19/44* (2010.01)
*G01S 19/33* (2010.01)
*G01S 19/14* (2010.01)

(52) U.S. Cl.
CPC .............. *G01S 19/44* (2013.01); *G01S 19/14* (2013.01); *G01S 19/33* (2013.01)

(58) Field of Classification Search
CPC ........... G01S 19/14; G01S 19/33; G01S 19/44
See application file for complete search history.

(56) References Cited

FOREIGN PATENT DOCUMENTS

| CN | 102323601 A | * | 1/2012 | |
|----|-------------|---|--------|---|
| CN | 103926601 B | * | 6/2016 | ............. G01S 19/24 |
| CN | 113721272 A | * | 11/2021 | |

* cited by examiner

*Primary Examiner* — Dao L Phan

(57) ABSTRACT

Provided is a BeiDou navigation satellite B1C signal capturing method, including: mixing a digital intermediate frequency signal with a local intermediate frequency carrier signal to obtain a baseband signal; obtaining a local BOC-like signal on a data channel and a local BOC-like signal on a pilot channel; processing the local BOC-like signal on the data channel and the local BOC-like signal on the pilot channel to obtain a cross-correlation result of the data channel and a cross-correlation result of the pilot channel; performing a linear operation on the cross-correlation result of each of the two channels through a pseudo-correlation function generator to eliminate a secondary peak in the cross-correlation result of each of the two channels, and obtain an optimized cross-correlation result of each of the two channels; and capturing a satellite signal based on the optimized cross-correlation result of each of the two channels.

18 Claims, 5 Drawing Sheets

Phase delay (chip)

BEIDOU NAVIGATION SATELLITE B1C SIGNAL CAPTURING METHOD, AND RELATED APPARATUS

CROSS-REFERENCE TO RELATED APPLICATION

The present application claims priority to Chinese Application No. 202111017107.3, filed on Aug. 31, 2021, which is hereby incorporated by reference in its entirety.

TECHNICAL FIELD

The present disclosure relates to the field of satellite navigation technologies, and more particularly, to a BeiDou navigation satellite B1C signal capturing method and a related apparatus.

BACKGROUND

In the context of the rapid development of satellite navigation technology, frequency band resources of satellite signals are increasingly strained. It is the biggest problem to separate signal spectrums of satellite navigation systems of different countries and prevent mutual interference between military and civilian signals, and the emergence of Binary Offset Carrier (BOC) modulation solves this problem. Since the BOC modulation can realize spectrum splitting of satellite signals, it not only solves a problem of spectrum congestion and mutual interference of satellite signals, but also tackles a safety problem of navigation signals in a transmission process. In addition, compared with conventional Binary Phase Shift Keying (BPSK) modulation, the BOC modulation has another feature of a sharper autocorrelation peak of satellite signals, which means that BOC-modulated signals have better anti-interference performance and higher positioning precision. Therefore, the emergence of BOC modulation technology has received extensive attention. At present, Global Positioning System (GPS) modernization and Galileo system have applied the BOC modulation technology to the modulation technology of satellite signals. Also, for China's BeiDou Navigation Satellite System, the BOC modulation technology is applied to Beidou-3 navigation satellite B1C signals.

The emergence of BOC modulation technology can well solve the problem of frequency band congestion caused by the development of global satellite navigation systems, but the BOC modulation technology also brings a problem of multi-autocorrelation peaks, which leads to false capture and false lock of signals if the multi-peak characteristic of the BOC modulation technology cannot be eliminated or weakened. A BeiDou navigation satellite B1C signal is divided into a data channel that adopts BOC(1,2) modulation and a pilot channel that adopts QMBOC(6,1,4/33) modulation. Such a special modulation manner causes the power spectral density of navigation signals to have a number of main lobes and side lobes, and generates a problem of multi-correlation secondary peaks in a pseudo-code correlation function, thereby leading to ambiguity in a capturing process.

SUMMARY

The present disclosure provides a BeiDou navigation satellite B1C signal capturing method and a related apparatus, capable of alleviating an existing technical problem of ambiguity in a signal capturing process resulted from multi-correlation secondary peaks of a pseudo-code correlation function for BeiDou navigation satellite B1C signals.

In view of this, in a first aspect of the present disclosure, a BeiDou navigation satellite B1C signal capturing method is provided. The method includes: mixing a digital intermediate frequency signal obtained from a received BeiDou navigation satellite B1C signal with a local intermediate frequency carrier signal to obtain a baseband signal; obtaining a local BOC-like signal on a data channel and a local BOC-like signal on a pilot channel through a ranging code chip and a step modulation symbol; processing the local BOC-like signal on the data channel and the local BOC-like signal on the pilot channel, performing a multiplication operation on the baseband signal after a fast Fourier transform and the processed local BOC-like signal on the data channel to obtain a first result, performing a multiplication operation on the baseband signal after the fast Fourier transform and the processed local BOC-like signal on the pilot channel to obtain a second result, and performing an inverse fast Fourier transform on the first result and on the second result to obtain a cross-correlation result of the data channel and a cross-correlation result of the pilot channel; performing a linear operation on the cross-correlation result of the data channel and the cross-correlation result of the pilot channel through a pseudo-correlation function generator to eliminate secondary peaks in the cross-correlation results and obtain an optimized cross-correlation result of the data channel and an optimized cross-correlation result of the pilot channel; and capturing a satellite signal based on the optimized cross-correlation result of the data channel and the optimized cross-correlation result of the pilot channel, and outputting, after a success of the capturing, a code phase value corresponding to the ranging code chip and a Doppler frequency shift corresponding to the local intermediate frequency carrier signal.

Optionally, the step modulation symbol includes a first step modulation symbol $d_1[1,0]$, a second step modulation symbol $d_2[0,1]$, a third step modulation symbol $d_3[j,0]$, a fourth step modulation symbol $d_4[0,j]$, a fifth step modulation symbol $d_5[1,0,0,0,0,0,0,0,0,0,0,0]$, and a sixth step modulation symbol $d_6[0,0,0,0,0,0,0,0,0,0,0,1]$, the local BOC-like signal on the data channel includes a first local BOC-like signal and a second local BOC-like signal, and the local BOC-like signal on the pilot channel includes a third local BOC-like signal, a fourth local BOC-like signal, a fifth local BOC-like signal, and a sixth local BOC-like signal; and obtaining the local BOC-like signal on the data channel and the local BOC-like signal on the pilot channel through the ranging code chip and the step modulation symbol includes: modulating the ranging code chip with each of the first step modulation symbol $d_1[1,0]$ and the second step modulation symbol $d_2[0,1]$ to obtain the first local BOC-like signal corresponding to the first step modulation symbol $d_1[1,0]$ and the second local BOC-like signal corresponding to the second step modulation symbol $d_2[0,1]$; and modulating the ranging code chip with each of the third step modulation symbol $d_3[j,0]$, the fourth step modulation symbol $d_4[0,j]$, the fifth step modulation symbol $d_5[1,0,0,0,0,0,0,0,0,0,0,0]$, and the sixth step modulation symbol $d_6[0,0,0,0,0,0,0,0,0,0,0,1]$ to obtain the third local BOC-like signal corresponding to the third step modulation symbol $d_3[j,0]$, the fourth local BOC-like signal corresponding to the fourth step modulation symbol $d_4[0,j]$, the fifth local BOC-like signal corresponding to the fifth step modulation symbol $d_5[1,0,0,0,0,0,0,0,0,0,0,0]$, and the sixth local BOC-like signal corresponding to the sixth step modulation symbol $d_6[0,0,0,0,0,0,0,0,0,0,0,1]$.

Optionally, the cross-correlation result of the data channel includes a first cross-correlation result and a second cross-correlation result, and the cross-correlation result of the pilot channel includes a third cross-correlation result, a fourth cross-correlation result, a fifth cross-correlation result, and a sixth cross-correlation result; and performing the linear operation on the cross-correlation result of the data channel and the cross-correlation result of the pilot channel through the pseudo-correlation function generator to eliminate the secondary peaks in the cross-correlation results and obtain the optimized cross-correlation result of the data channel and the optimized cross-correlation result of the pilot channel includes: performing, based on a first pseudo-correlation function, the linear operation on the first cross-correlation result and the second cross-correlation result through the pseudo-correlation function generator to eliminate the secondary peak in the cross-correlation result of the data channel and obtain the optimized cross-correlation result of the data channel, in which the first pseudo-correlation function is $R_b(\tau)=|R_{bb1}(\tau)|+|R_{bb2}(\tau)|-|R_{bb1}(\tau)+R_{bb2}(\tau)|$, where $R_b(\tau)$ represents the optimized cross-correlation result of the data channel, $R_{bb1}(\tau)$ represents the first cross-correlation result, and $R_{bb2}(\tau)$ represents the second cross-correlation result; and performing, based on a second pseudo-correlation function, the linear operation on the third cross-correlation result, the fourth cross-correlation result, the fifth cross-correlation result, and the sixth cross-correlation result through the pseudo-correlation function generator to eliminate the secondary peak in the cross-correlation result of the pilot channel and obtain the optimized cross-correlation result of the pilot channel, in which the second pseudo-correlation function is $R_Q(\tau)=|R_{Qb3}(\tau)|+|R_{Qb4}(\tau)|-|R_{Qb3}(\tau)+R_{Qb4}(\tau)|+|R_{Qb5}(\tau)|+|R_{Qb6}(\tau)|-|R_{Qb5}(\tau)+R_{Qb6}(\tau)|$, where $R_Q(\tau)$ represents the optimized cross-correlation result of the pilot channel, $R_{Qb3}(\tau)$ represents the third cross-correlation result, $R_{Qb4}(\tau)$ represents the fourth cross-correlation result, $R_{Qb5}(\tau)$ represents the fifth cross-correlation result, and $R_{Qb6}(\tau)$ represents the sixth cross-correlation result.

Optionally, a processing process of the local BOC-like signal on the data channel and the local BOC-like signal on the pilot channel includes performing a fast Fourier transform and a conjugate processing on each of the local BOC-like signal on the data channel and the local BOC-like signal on the pilot channel to obtain the processed local BOC-like signal on the data channel and the processed local BOC-like signal on the pilot channel.

Optionally, capturing the satellite signal based on the optimized cross-correlation result of the data channel and the optimized cross-correlation result of the pilot channel, and outputting, after the success of the capturing, the code phase value corresponding to the ranging code chip and the Doppler frequency shift corresponding to the local intermediate frequency carrier signal includes: performing an integral operation on each of the optimized cross-correlation result of the data channel and the optimized cross-correlation result of the pilot channel, and performing a differential coherent combination on an integration result of the data channel and an integration result of the pilot channel through a differential coherent integrator to obtain a differential coherent combination result; and determining whether the differential coherent combination result is smaller than a threshold; when the differential coherent combination result is smaller than the threshold, adjusting a carrier frequency of the local intermediate frequency carrier signal, and returning to the step of mixing the digital intermediate frequency signal obtained from the received BeiDou navigation satellite B1C signal with the local intermediate frequency carrier signal to obtain the baseband signal; and when the differential coherent combination result is equal to or greater than the threshold, outputting the code phase value corresponding to the ranging code chip and the Doppler frequency shift corresponding to the local intermediate frequency carrier signal.

In a second aspect of the present disclosure, a BeiDou navigation satellite B1C signal capturing apparatus is provided. The apparatus includes: a mixing unit configured to mix a digital intermediate frequency signal obtained from a received BeiDou navigation satellite B1C signal with a local intermediate frequency carrier signal to obtain a baseband signal; an obtaining unit configured to obtain a local BOC-like signal on a data channel and a local BOC-like signal on a pilot channel through a ranging code chip and a step modulation symbol; a processing unit configured to process the local BOC-like signal on the data channel and the local BOC-like signal on the pilot channel, perform a multiplication operation on the baseband signal after a fast Fourier transform and the processed local BOC-like signal on the data channel to obtain a first result, perform a multiplication operation on the baseband signal after the fast Fourier transform and the processed local BOC-like signal on the pilot channel to obtain a second result, and perform an inverse fast Fourier transform on the first result and on the second result to obtain a cross-correlation result of the data channel and a cross-correlation result of the pilot channel; a linear operation unit configured to perform a linear operation on the cross-correlation result of the data channel and the cross-correlation result of the pilot channel through a pseudo-correlation function generator to eliminate secondary peaks in the cross-correlation results and obtain an optimized cross-correlation result of the data channel and an optimized cross-correlation result of the pilot channel; and a capturing unit configured to capture a satellite signal based on the optimized cross-correlation result of the data channel and the optimized cross-correlation result of the pilot channel, and output, after a success of the capturing, a code phase value corresponding to the ranging code chip and a Doppler frequency shift corresponding to the local intermediate frequency carrier signal.

Optionally, the step modulation symbol includes a first step modulation symbol $d_1[1,0]$, a second step modulation symbol $d_2[0,1]$, a third step modulation symbol $d_3[j,0]$, a fourth step modulation symbol $d_4[0,j]$, a fifth step modulation symbol $d_5[1,0,0,0,0,0,0,0,0,0,0,0]$, and a sixth step modulation symbol $d_6[0,0,0,0,0,0,0,0,0,0,0,1]$, the local BOC-like signal on the data channel includes a first local BOC-like signal and a second local BOC-like signal, and the local BOC-like signal on the pilot channel includes a third local BOC-like signal, a fourth local BOC-like signal, a fifth local BOC-like signal, and a sixth local BOC-like signal; and the obtaining unit is configured to: modulate the ranging code chip with each of the first step modulation symbol $d_1[1,0]$ and the second step modulation symbol $d_2[0,1]$ to obtain the first local BOC-like signal corresponding to the first step modulation symbol $d_1[1,0]$ and the second local BOC-like signal corresponding to the second step modulation symbol $d_2[0,1]$; and modulate the ranging code chip with each of the third step modulation symbol $d_3[j,0]$, the fourth step modulation symbol $d_4[0,j]$, the fifth step modulation symbol $d_5[1,0,0,0,0,0,0,0,0,0,0,0]$, and the sixth step modulation symbol $d_6[0,0,0,0,0,0,0,0,0,0,0,1]$ to obtain the third local BOC-like signal corresponding to the third step modulation symbol $d_3[j,0]$, the fourth local BOC-like signal corresponding to the fourth step modulation symbol $d_4[0,j]$, the fifth local BOC-like signal corresponding to the fifth step modulation symbol $d_5[1,0,0,0,0,0,0,0,0,0,0,0]$, and the sixth local BOC-like signal corresponding to the sixth step modulation symbol $d_6[0,0,0,0,0,0,0,0,0,0,0,1]$.

Optionally, the cross-correlation result of the data channel includes a first cross-correlation result and a second cross-correlation result, and the cross-correlation result of the pilot channel includes a third cross-correlation result, a fourth cross-correlation result, a fifth cross-correlation result, and a sixth cross-correlation result; and the linear operation unit is configured to: perform, based on a first pseudo-correlation function, the linear operation on the first cross-correlation result and the second cross-correlation result through the pseudo-correlation function generator to eliminate the secondary peak in the cross-correlation result of the data channel and obtain the optimized cross-correlation result of the data channel, in which the first pseudo-correlation function is $R_b(\tau)=|R_{bb1}(\tau)|+|R_{bb1}(\tau)+R_{bb2}(\tau)|$, where $R_b(\tau)$ represents the optimized cross-correlation result of the data channel, $R_{bb1}(\tau)$ represents the first cross-correlation result, and $R_{bb2}(\tau)$ represents the second cross-correlation result; and perform, based on a second pseudo-correlation function, the linear operation on the third cross-correlation result, the fourth cross-correlation result, the fifth cross-correlation result, and the sixth cross-correlation result through the pseudo-correlation function generator to eliminate the secondary peak in the cross-correlation result of the pilot channel and obtain the optimized cross-correlation result of the pilot channel, in which the second pseudo-correlation function is $R_Q(\tau)=|R_{Qb3}(\tau)|+|R_{Qb4}(\tau)|-|R_{Qb3}(\tau)+R_{Qb4}(\tau)|+|R_{Qb5}(\tau)|+|R_{Qb6}(\tau)|-|R_{Qb5}(\tau)+R_{Qb6}(\tau)|$, where $R_Q(\tau)$ represents the optimized cross-correlation result of the pilot channel, $R_{Qb3}(\tau)$ represents the third cross-correlation result, $R_{Qb4}(\tau)$ represents the fourth cross-correlation result, $R_{Qb5}(\tau)$ represents the fifth cross-correlation result, and $R_{Qb6}(\tau)$ represents the sixth cross-correlation result.

In a third aspect of the present disclosure, a BeiDou navigation satellite B1C signal capturing device is provided. The device includes a processor and a memory. The memory is configured to store program codes, and transmit the program codes to the processor. The processor is configured to implement, based on instructions in the program codes, any one of the BeiDou navigation satellite B1C signal capturing methods in the first aspect.

In a fourth aspect of the present disclosure, a computer-readable storage medium is provided. The computer-readable storage medium stores program codes. The program codes, when executed by a processor, implement any one of the BeiDou navigation satellite B1C signal capturing methods in the first aspect.

It can be seen from the above technical solutions that the present disclosure has the following advantages.

The present disclosure provides a BeiDou navigation satellite B1C signal capturing method. The method includes: mixing a digital intermediate frequency signal obtained from a received BeiDou navigation satellite B1C signal with a local intermediate frequency carrier signal to obtain a baseband signal; obtaining a local BOC-like signal on a data channel and a local BOC-like signal on a pilot channel through a ranging code chip and a step modulation symbol; processing the local BOC-like signal on the data channel and the local BOC-like signal on the pilot channel, performing a multiplication operation on the baseband signal after a fast Fourier transform and the processed local BOC-like signal on the data channel to obtain a first result, performing a multiplication operation on the baseband signal after the fast Fourier transform and the processed local BOC-like signal on the pilot channel to obtain a second result, and performing an inverse fast Fourier transform on the first result and on the second result to obtain a cross-correlation result of the data channel and a cross-correlation result of the pilot channel; performing a linear operation on the cross-correlation result of the data channel and the cross-correlation result of the pilot channel through a pseudo-correlation function generator to eliminate secondary peaks in the cross-correlation results and obtain an optimized cross-correlation result of the data channel and an optimized cross-correlation result of the pilot channel; and capturing a satellite signal based on the optimized cross-correlation result of the data channel and the optimized cross-correlation result of the pilot channel, and outputting, after a success of the capturing, a code phase value corresponding to the ranging code chip and a Doppler frequency shift corresponding to the local intermediate frequency carrier signal.

In the present disclosure, according to a pseudo-code characteristic of a BeiDou navigation satellite B1C signal, the local BOC-like signal is generated for each of the data channel and the pilot channel, and a pseudo-correlation function is constructed for a received signal and each of local signals, so as to solve a problem of ambiguity caused by the secondary peak, and capture satellite signals in a fast and effective manner, and finally, satellite signals are captured on the basis of the optimized cross-correlation result of the data channel and the optimized cross-correlation result of the pilot channel, thereby alleviating an existing technical problem of ambiguity in a signal capturing process resulted from multi-correlation secondary peaks of a pseudo-code correlation function for BeiDou navigation satellite B1C signals.

BRIEF DESCRIPTION OF DRAWINGS

In order to clearly explain technical solutions of the embodiments of the present disclosure or in the prior art, drawings used in the description of the embodiments or in the prior art are briefly described below. Obviously, the drawings as described below are merely some embodiments of the present disclosure. Based on these drawings, other drawings can be obtained by those skilled in the art without inventive effort.

DESCRIPTION OF EMBODIMENTS

The present disclosure provides a BeiDou navigation satellite B1C signal capturing method and a related apparatus, capable of alleviating an existing technical problem of ambiguity in a signal capturing process resulted from multi-correlation secondary peaks of a pseudo-code correlation function for BeiDou navigation satellite B1C signals.

In order to provide a better understating of the present disclosure for those skilled in the art, technical solutions according to embodiments of the present disclosure will be described clearly and completely below in combination with accompanying drawings of the embodiments of the present disclosure. Obviously, the embodiments described below are only some of the embodiments of the present disclosure, rather than all embodiments of the present disclosure. On a basis of the embodiments of the present disclosure, all other embodiments obtained by those skilled in the art without creative labor shall fall within the protection scope of the present disclosure.

Figure 1:
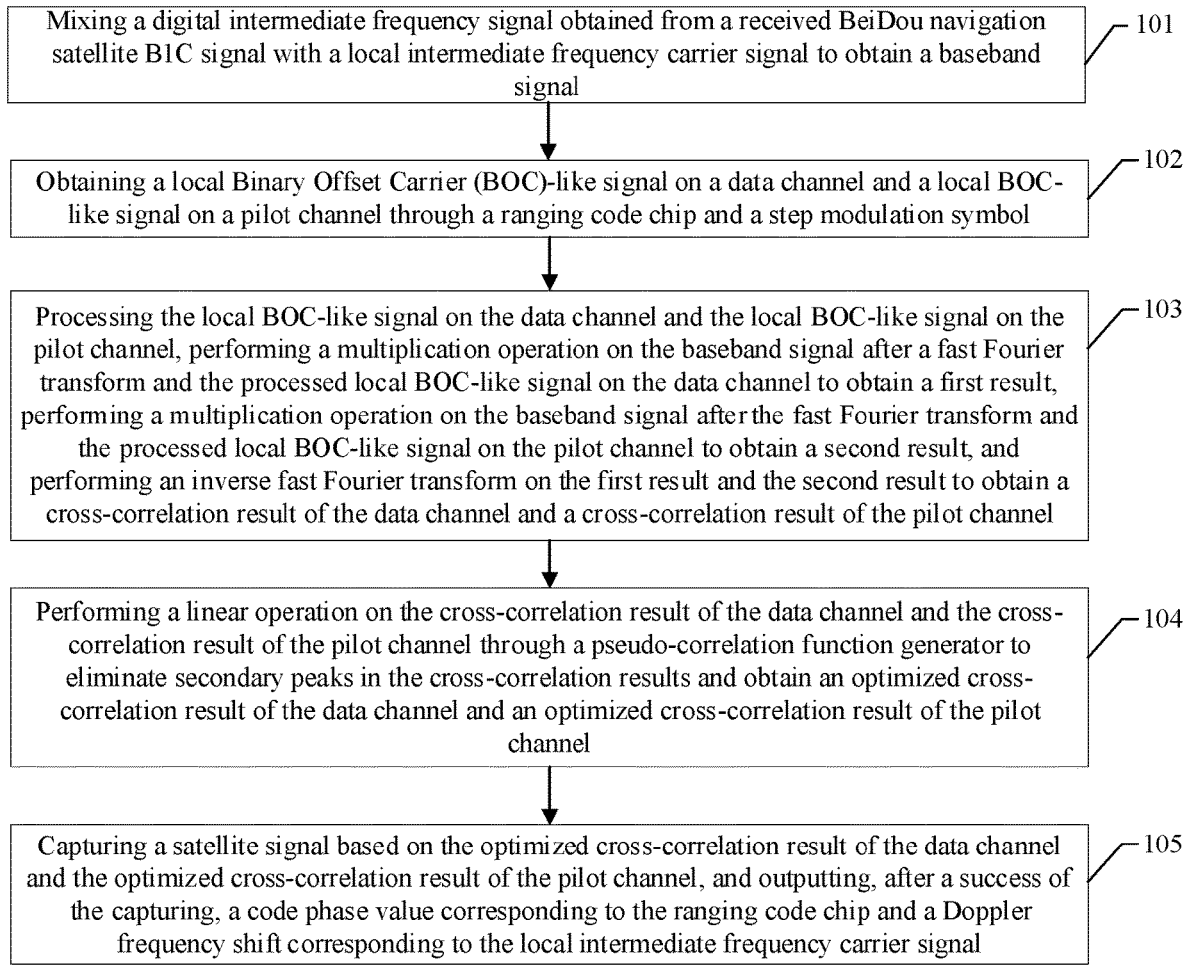
FIG. 1 is a schematic flowchart illustrating a BeiDou navigation satellite B1C signal capturing method according to an embodiment of the present disclosure.
Figure 2:
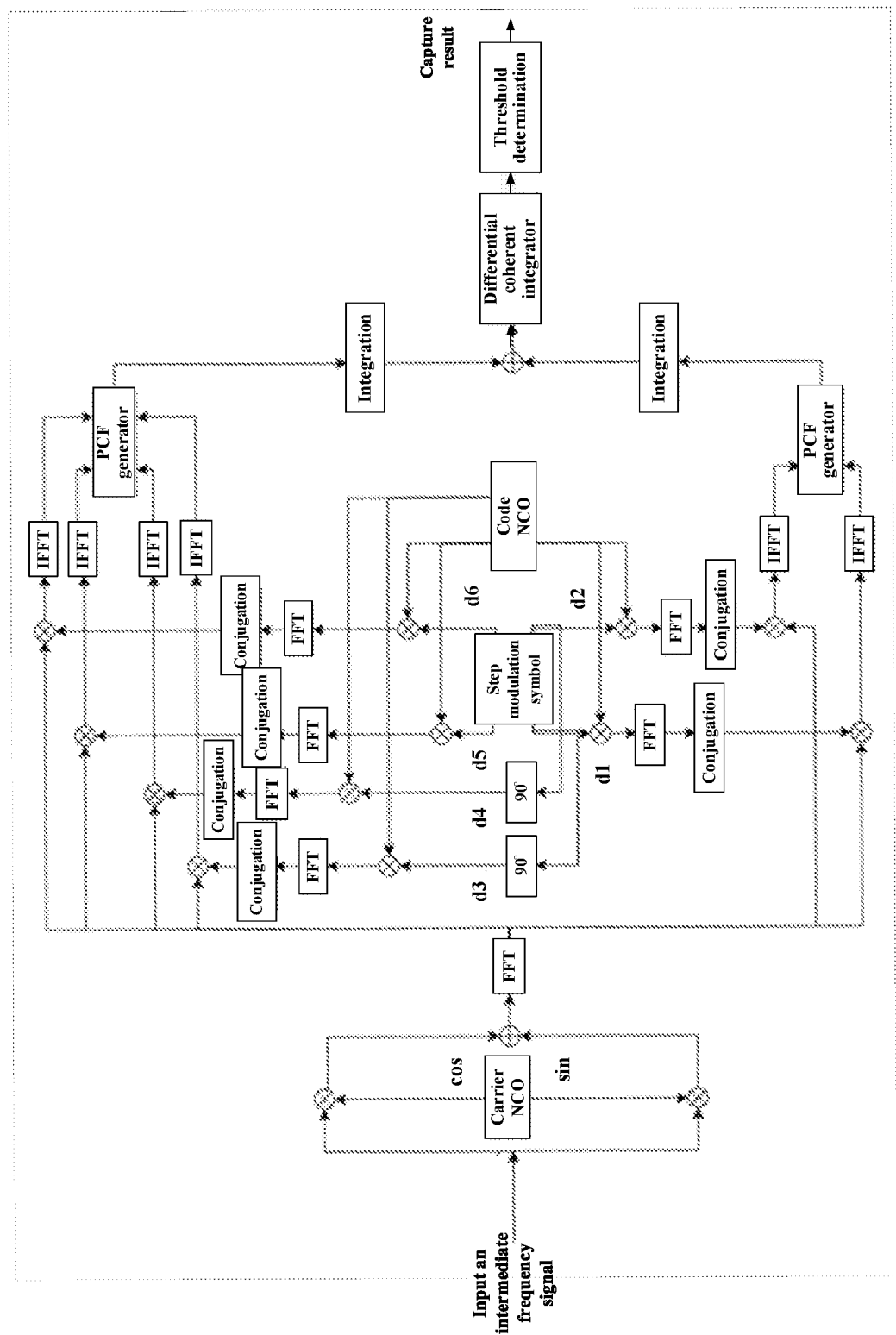
FIG. 2 is a block diagram showing a principle of a BeiDou navigation satellite B1C signal capturing method according to an embodiment of the present disclosure.

For a better understanding, reference may be made to FIG. 1 and FIG. 2. A BeiDou navigation satellite B1C signal capturing method according to an embodiment of the present disclosure includes the following steps.

At step 101, a digital intermediate frequency signal obtained from a received BeiDou navigation satellite B1C signal is mixed with a local intermediate frequency carrier signal to obtain a baseband signal.

The received BeiDou navigation satellite B1C signal is obtained and processed to obtain the digital intermediate frequency signal, and the digital intermediate frequency signal is mixed with the local intermediate frequency carrier signal to obtain the baseband signal.

At step 102, a local BOC-like signal on a data channel and a local BOC-like signal on a pilot channel are obtained through a ranging code chip and a step modulation symbol.

To obtain a pseudo-correlation function, it is necessary to design appropriate local BOC-like signals for satellite signals in different BOC modulation manners. Two kinds of local BOC-like signals that mirror each other are supposed to be:

$$b_1(t,d_1) = \Sigma_{k=0}^{N-1} \psi(t) \cdot d_k^{(1)}; \text{ and}$$

$$b_2(t,d_2) = \Sigma_{k=0}^{N-1} \psi(t) \cdot d_k^{(2)}.$$

In the formulas, $b_1(t,d_1)$ represents a first local BOC-like signal, N represents a modulation coefficient of a BOC adjustment signal, $\psi(t)$ represents a ranging code sequence, a first step modulation symbol is $d_1=(d_0^{(1)}, d_1^{(1)}, \ldots d_k^{(1)}, \ldots, d_{N-1}^{(1)})$, and $d_k^{(1)}$ represents a (k+1)-th element in the first step modulation symbol; and $b_2(t, d_2)$ represents a second local BOC-like signal, a second step modulation symbol is $d_2=(d_0^{(2)}, d_1^{(2)}, \ldots d_k^{(2)}, \ldots, d_{N-1}^{(2)})$, and $d_k^{(2)}$ represents a (k+1)-th element in the second step modulation symbol. Since the two groups of local BOC-like signal sequences mirror each other, $d_k^{(2)} = d_{N-k-1}^{(1)}$.

Since the data channel of the BeiDou navigation satellite B1C signal uses a BOC(1,1) modulation manner, each ranging code chip (code NCO) can be modulated with the first step modulation symbol $d_1[1,0]$ and the second step modulation symbol $d_2[0,1]$ in the above manner to generate two groups of local BOC-like signals on the data channel, i.e., the first local BOC-like signal and the second local BOC-like signal.

A QMBOC(6,1,4/33) signal on the pilot channel of the BeiDou navigation satellite B1C signal can be regarded as a combination of a BOC(1,1) signal and a BOC(6,1) signal at a power ratio of 29:4, and the BOC(1,1) signal and the BOC(6,1) signal are orthogonal to each other. According to such a special pseudo-code modulation manner, each ranging code chip can be modulated with a third step modulation symbol $d_3[j,0]$, a fourth step modulation symbol $d_4[0,j]$, a fifth step modulation symbol $d_5[1,0,0,0,0,0,0,0,0,0,0,0]$, and a sixth step modulation symbol $d_6[0,0,0,0,0,0,0,0,0,0,0,1]$ to generate four groups of local BOC-like signals on the pilot channel, i.e., a third local BOC-like signal, a fourth local BOC-like signal, a fifth local BOC-like signal, and a sixth local BOC-like signal. Since the BOC(1,1) signal and the BOC(6,1) signal in the QMBOC signal are orthogonal to each other, $d_3$ and $d_4$ are orthogonal to $d_5$ and $d_6$. A specific modulation process of the pilot channel is similar to that of the data channel, and details thereof will be omitted here.

At step 103, the local BOC-like signal on the data channel and the local BOC-like signal on the pilot channel are processed, a multiplication operation is performed on the baseband signal after a fast Fourier transform and the processed local BOC-like signal on the data channel to obtain a first result, a multiplication operation is performed on the baseband signal after a fast Fourier transform and the processed local BOC-like signal on the pilot channel to obtain a second result, and an inverse fast Fourier transform is performed on the first result and the second result to obtain a cross-correlation result of the data channel and a cross-correlation result of the pilot channel.

The local BOC-like signal on the data channel and the local BOC-like signal on the pilot channel are processed in a manner of performing a fast Fourier transform and a conjugate processing on each of the local BOC-like signal on the data channel and the local BOC-like signal on the pilot channel to obtain the processed local BOC-like signal on the data channel and the processed local BOC-like signal on the pilot channel.

After the fast Fourier transform is performed on the baseband signal, the multiplication operation is performed on the baseband signal after the fast Fourier transform and the processed first local BOC-like signal (including the processed first local BOC-like signal and the processed second local BOC-like signal) on the data channel to obtain the first result, the multiplication operation is performed on the baseband signal after the fast Fourier transform and the processed local BOC-like signal (including the processed third local BOC-like signal, the processed fourth local BOC-like signal, the processed fifth local BOC-like signal, and the processed sixth local BOC-like signal) on the pilot channel to obtain the second result, and the inverse fast Fourier transform is performed on the first result and the second result to obtain the cross-correlation result (including a first cross-correlation result and a second cross-correlation result) of the data channel and the cross-correlation result (including a third cross-correlation result, a fourth cross-correlation result, a fifth cross-correlation result, and a sixth cross-correlation result) of the pilot channel.

Specifically, the transformed baseband signal is multiplied by the processed first local BOC-like signal, and the inverse fast Fourier transform is performed on a multiplication result to obtain the first cross-correlation result $R_{bb1}(\tau)$; and the transformed baseband signal is multiplied by the processed second local BOC-like signal, and the inverse fast Fourier transform is performed on a multiplication result to obtain the second cross-correlation result $R_{bb2}(\tau)$. Here, a cross-correlation result of the BOC(1,1) signal and the local BOC-like signal on the data channel can be referred to FIG. 3.

Figure 4:
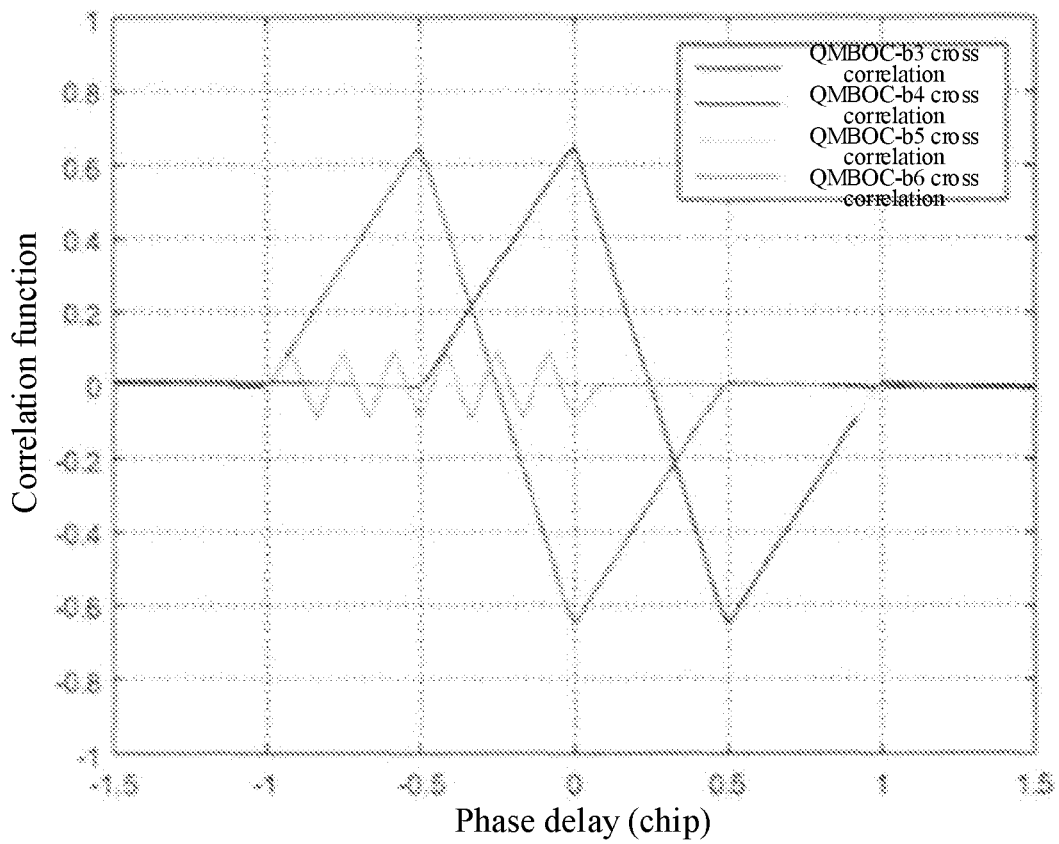
FIG. 4 is a schematic diagram showing a cross-correlation result between a QMBOC(6,1,4/33) signal and a local BOC-like signal on a pilot channel according to an embodiment of the present disclosure.

The transformed baseband signal is multiplied by the processed third local BOC-like signal, and the inverse fast Fourier transform is performed on a multiplication result to obtain the third cross-correlation result $R_{Qb3}(\tau)$; the transformed baseband signal is multiplied by the processed fourth local BOC-like signal, and the inverse fast Fourier transform is performed on a multiplication result to obtain the fourth cross-correlation result $R_{Qb4}(\tau)$; the transformed baseband signal is multiplied by the processed fifth local BOC-like signal, and the inverse fast Fourier transform is performed on a multiplication result to obtain the fifth cross-correlation result $R_{Qb5}(\tau)$; and the transformed baseband signal is multiplied by the processed sixth local BOC-like signal, and the inverse fast Fourier transform is performed on a multiplication result to obtain the sixth cross-correlation result $R_{Qb6}(\tau)$. Here, a cross-correlation result of the QMBOC(6, 1,4/33) signal and the local BOC-like signal on the pilot channel can be referred to FIG. 4.

At step 104, a linear operation is performed on the cross-correlation result of the data channel and the cross-correlation result of the pilot channel through a pseudo-correlation function generator to eliminate secondary peaks in the cross-correlation results and obtain an optimized cross-correlation result of the data channel and an optimized cross-correlation result of the pilot channel.

According to characteristics of the first step modulation symbol $d_1[1,0]$ and the second step modulation symbol $d_2[0,1]$, it can be obtained that a relation between the first cross-correlation result $R_{bb1}(\tau)$ and the second cross-correlation result $R_{bb2}(\tau)$ is:

$$R_{bb2}(\tau) = -R_{bb1}(-\tau).$$

It can be seen from the above formula that the first cross-correlation result $R_{bb1}(\tau)$ and the second cross-correlation result $R_{bb2}(\tau)$ are centrosymmetrical about an origin. A first pseudo-correlation function is constructed by an absolute value operation and a mathematical weighting operation to eliminate a secondary peak, thereby obtaining a cross-correlation result with only a correlation main peak.

The linear operation is performed, based on the first pseudo-correlation function, on the first cross-correlation result and the second cross-correlation result through the pseudo-correlation function generator to eliminate the secondary peak in the cross-correlation result of the data channel and obtain the optimized cross-correlation result of the data channel. Here, the first pseudo-correlation function is:

$$R_b(\tau) = |R_{bb1}(\tau)| + |R_{bb2}(\tau)| - |R_{bb1}(\tau) + R_{bb2}(\tau)|.$$

In the formula, $R_b(\tau)$ represents the optimized cross-correlation result of the data channel, $R_{bb1}(\tau)$ represents the first cross-correlation result, and $R_{bb2}(\tau)$ represents the second cross-correlation result.

Figure 3:
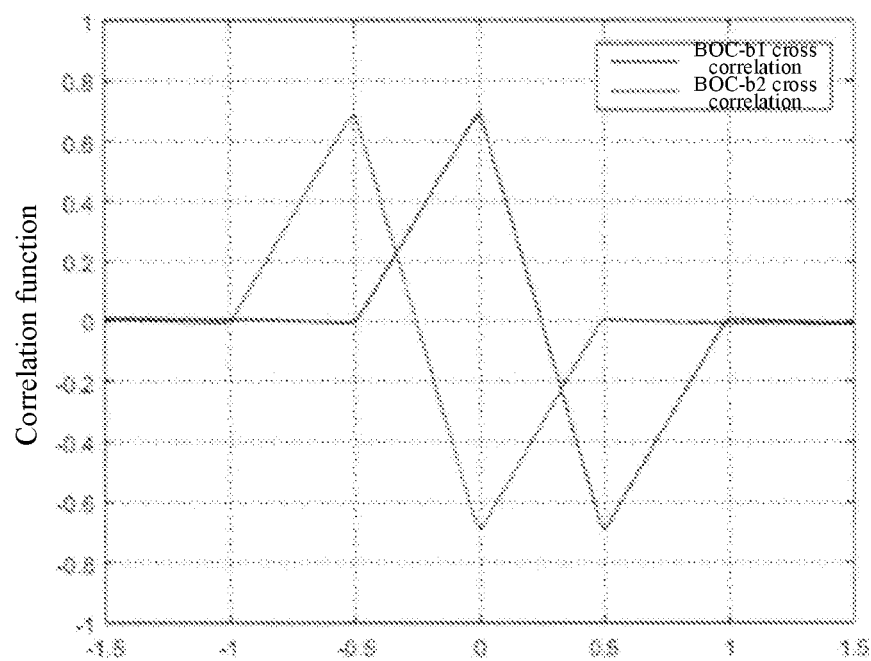
FIG. 3 is a schematic diagram showing a cross-correlation result between a BOC(1,1) signal and a local BOC-like signal on a data channel according to an embodiment of the present disclosure.
Figure 5:
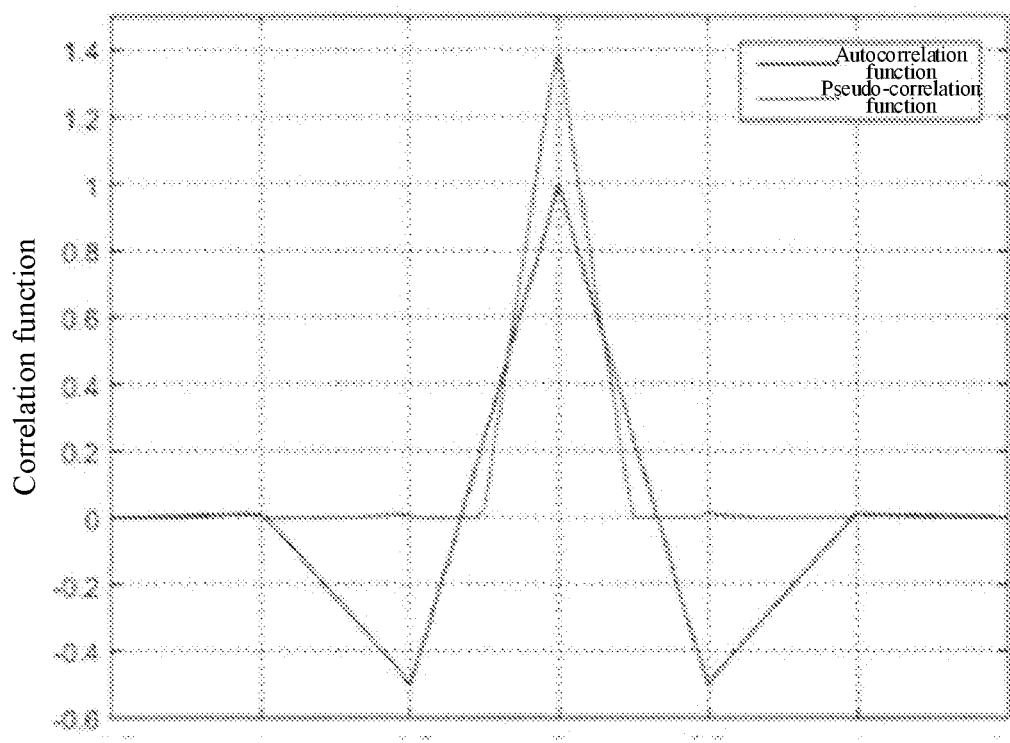
FIG. 5 is a schematic diagram showing a pseudo-correlation function of a BOC(1,1) signal according to an embodiment of the present disclosure.

Referring to FIG. 3, waveforms of cross-correlation results of the BOC(1,1) signal and the local BOC-like signal are identical to each other, and each of the waveforms is centrosymmetrical about an origin. Considering the symmetry of the waveforms, the two cross-correlation results can be linearly combined to cancel secondary peak values at ±0.5 chips and retain only a correlation value at a center chip. As illustrated in FIG. 5, a pseudo-correlation function of the BOC(1,1) signal is constructed by using the formula of the first pseudo-correlation function.

In the embodiments of the present disclosure, the pseudo-correlation function of the BOC(1,1) signal barely has a correlation secondary peak, and thus an influence on signal capture resulted from a secondary peak of an autocorrelation function of the BOC(1,1) signal can be effectively avoided. A peak value of the pseudo-correlation function being greater than 1 indicates that the pseudo-correlation function is not a real correlation function, but a correlation main peak of the function can be used to capture signals.

The linear operation is performed, based on a second pseudo-correlation function, on the third cross-correlation result, the fourth cross-correlation result, the fifth cross-correlation result, and the sixth cross-correlation result through the pseudo-correlation function generator to eliminate the secondary peak in the cross-correlation result of the pilot channel and obtain the optimized cross-correlation result of the pilot channel. Here, the second pseudo-correlation function is:

$$R_Q(\tau) = |R_{Qb3}(\tau)| + |R_{Qb4}(\tau)| - |R_{Qb3}(\tau) + R_{Qb4}(\tau)| + |R_{Qb5}(\tau)| + |R_{Qb6}(\tau)| - |R_{Qb5}(\tau) + R_{Qb6}(\tau)|.$$

Figure 6:
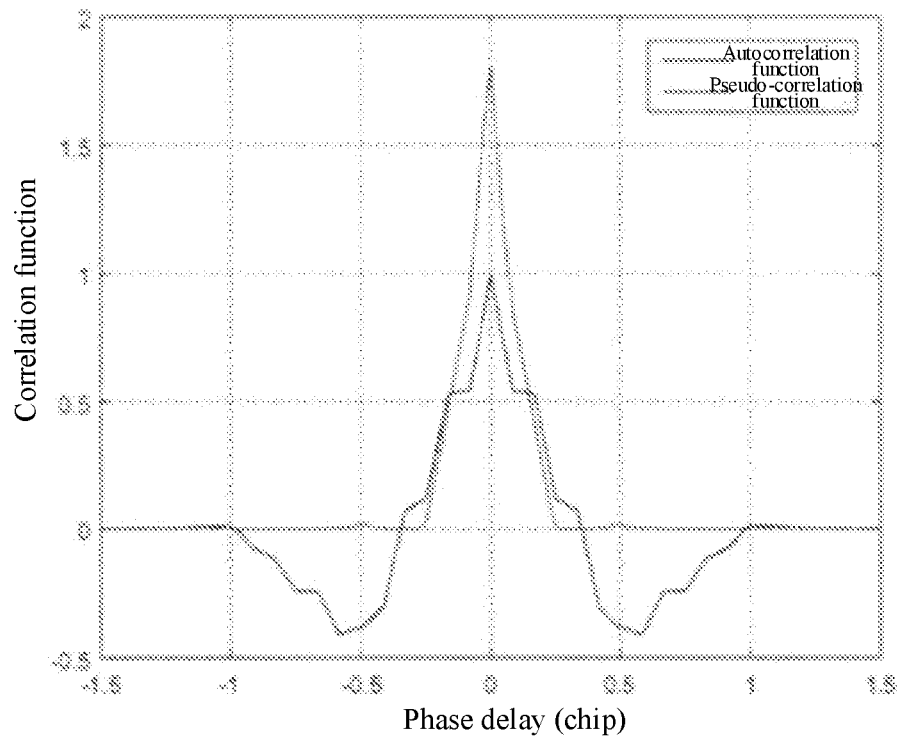
FIG. 6 is a schematic diagram showing a pseudo-correlation function of a QMBOC(6,1,4/33) signal according to an embodiment of the present disclosure.

In the formula, $R_Q(\tau)$ represents the optimized cross-correlation result of the pilot channel, $R_{Qb3}(\tau)$ represents the third cross-correlation result, $R_{Qb4}(\tau)$ represents the fourth cross-correlation result, $R_{Qb5}(\tau)$ represents the fifth cross-correlation result, and $R_{Qb6}(\tau)$ represents the sixth cross-correlation result. As illustrated in FIG. 6, a pseudo-correlation function of the QMBOC(6,1,4/33) signal is constructed by using the formula of the second pseudo-correlation function.

According to the embodiments of the present disclosure, a pseudo-correlation function of the QMBOC(6,1,4/33) signal designed on a basis of a pseudo-code characteristic of the BeiDou navigation satellite B1C signal has no correlation secondary peaks, and secondary peak values at ±0.5 chips are effectively suppressed. Compared with a main peak of an original autocorrelation function, a main peak of the pseudo-correlation function has a narrower width and a sharper waveform, with better anti-interference performance and higher code phase capture precision. The main peak value reaches 1.8, which can improve sensitivity of signal capture. In the step modulation symbols used to modulate local pilot pseudo-codes, since $d_3$ and $d_4$ have a 90-degree phase relation with the step modulation symbols $(d_1,d_2)$ of local data pseudo-codes, in terms of generating local pseudo-codes, only two groups of step modulation symbols, $d_5$ and $d_6$, need to be added, which reduces design complexity of a capture algorithm and improves utilization efficiency of hardware resources of a receiver.

At step 105, a satellite signal is captured based on the optimized cross-correlation result of the data channel and the optimized cross-correlation result of the pilot channel, and a code phase value corresponding to the ranging code chip and a Doppler frequency shift corresponding to the local intermediate frequency carrier signal are outputted after a success of the capturing.

An integral operation is performed on each of the optimized cross-correlation result of the data channel and the optimized cross-correlation result of the pilot channel, and a differential coherent combination is performed on an integration result of the data channel and an integration result of the pilot channel through a differential coherent integrator to obtain a differential coherent combination result.

Whether the differential coherent combination result is smaller than a threshold is determined. When the differential coherent combination result is smaller than the threshold, a carrier frequency of the local intermediate frequency carrier signal is adjusted, and it is returned to the step of mixing the digital intermediate frequency signal obtained from the received BeiDou navigation satellite B1C signal with the local intermediate frequency carrier signal to obtain the baseband signal. When the differential coherent combination result is equal to or greater than the threshold, the code phase value corresponding to the ranging code chip and the Doppler frequency shift corresponding to the local intermediate frequency carrier signal are outputted.

No navigation message appears in a pilot frequency component of the BeiDou navigation satellite B1C signal, and performance of a tracking loop can be improved by prolonging coherent integration time, as a result, the BeiDou navigation satellite B1C signal can be tracked by using only the pilot frequency component. For the capture of the BeiDou navigation satellite B1C signal, only a code phase estimate value and a Doppler frequency shift estimate value of a navigation signal need to be obtained. Precision requirements of the estimate values are not as high as those of a tracking part of the navigation signal. In addition, the coherent integration time being too long may increase a calculation amount of the capture algorithm, which results in long capture time. Therefore, capturing a pilot component alone may lose signal energy of a data component, resulting lowered capture sensitivity.

In view of the above problems, according to the embodiments of the present disclosure, both the data component and the pilot component of the BeiDou navigation satellite B1C signal are captured, and the differential coherent combination is performed on the integration result of the pilot channel and the integration result of the data channel. The differential coherent combination result is used for determination with a threshold. In a differential coherent integration method, non-correlation of two adjacent symbols correlation results is used, and the correlation results are accumulated after being conjugated and being multiplied, thereby reducing a square loss and weakening an influence of a data bit jump of navigation message data. A power ratio of the data component and the pilot component of the BeiDou navigation satellite B1C signal is 1:3, and thus the capture method adopting a differential coherent combination capture strategy, compared with a conventional method that only captures the pilot component, further mitigates an influence of signal cancellation and improves the capture sensitivity.

In the embodiments of the present disclosure, according to a pseudo-code characteristic of a BeiDou navigation satellite B1C signal, the local BOC-like signal is generated for each of the data channel and the pilot channel, and a pseudo-correlation function is constructed for a received signal and each of local signals, so as to solve a problem of ambiguity caused by the secondary peak, and capture satellite signals in a fast and effective manner, and finally, satellite signals are captured on the basis of the optimized cross-correlation result of the data channel and the optimized cross-correlation result of the pilot channel, thereby alleviating an existing technical problem of ambiguity in a signal capturing process resulted from multi-correlation secondary peaks of a pseudo-code correlation function for BeiDou navigation satellite B1C signals.

An embodiment of the BeiDou navigation satellite B1C signal capturing method provided by the present disclosure has been described above, and an embodiment of a BeiDou navigation satellite B1C signal capturing apparatus provided by the present disclosure will be described below.

Figure 7:
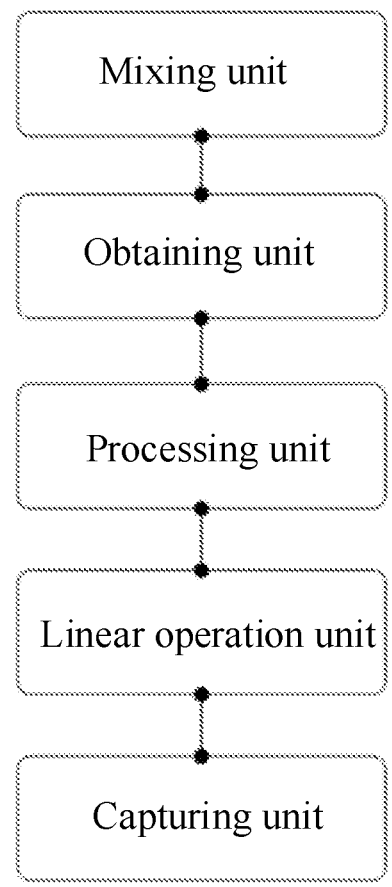
FIG. 7 is a block diagram showing a structure of a BeiDou navigation satellite B1C signal capturing apparatus according to an embodiment of the present disclosure.

Referring to FIG. 7, the BeiDou navigation satellite B1C signal capturing apparatus according to the embodiment of the present disclosure includes a mixing unit, an obtaining unit, a processing unit, a linear operation unit, and a capturing unit.

The mixing unit is configured to mix a digital intermediate frequency signal obtained from a received BeiDou navigation satellite B1C signal with a local intermediate frequency carrier signal to obtain a baseband signal.

The obtaining unit is configured to obtain a local Binary Offset Carrier (BOC)-like signal on a data channel and a local BOC-like signal on a pilot channel through a ranging code chip and a step modulation symbol.

The processing unit is configured to process the local BOC-like signal on the data channel and the local BOC-like signal on the pilot channel, perform a multiplication operation on the baseband signal after a fast Fourier transform and the processed local BOC-like signal on the data channel to obtain a first result, perform a multiplication operation on the baseband signal after a fast Fourier transform and the processed local BOC-like signal on the pilot channel to obtain a second result, and perform an inverse fast Fourier transform on the first result and the second result to obtain a cross-correlation result of the data channel and a cross-correlation result of the pilot channel.

The linear operation unit is configured to perform a linear operation on the cross-correlation result of the data channel and the cross-correlation result of the pilot channel through a pseudo-correlation function generator to eliminate secondary peaks in the cross-correlation results and obtain an optimized cross-correlation result of the data channel and an optimized cross-correlation result of the pilot channel.

The capturing unit is configured to capture a satellite signal based on the optimized cross-correlation result of the data channel and the optimized cross-correlation result of the pilot channel, and output, after a success of the capturing, a code phase value corresponding to the ranging code chip and a Doppler frequency shift corresponding to the local intermediate frequency carrier signal.

As a further improvement, the step modulation symbol includes a first step modulation symbol $d_1[1,0]$, a second step modulation symbol $d_2[0,1]$, a third step modulation symbol $d_3[j,0]$, a fourth step modulation symbol $d_4[0,j]$, a fifth step modulation symbol $d_5[1,0,0,0,0,0,0,0,0,0,0,0]$, and a sixth step modulation symbol $d_6[0,0,0,0,0,0,0,0,0,0,0,1]$, the local BOC-like signal on the data channel includes a first local BOC-like signal and a second local BOC-like signal, and the local BOC-like signal on the pilot channel includes a third local BOC-like signal, a fourth local BOC-like signal, a fifth local BOC-like signal, and a sixth local BOC-like signal. The obtaining unit is specifically configured to: modulate the ranging code chip with each of the first step modulation symbol $d_1[1,0]$ and the second step modulation symbol $d_2[0,1]$ to obtain the first local BOC-like signal corresponding to the first step modulation symbol $d_1[1,0]$ and the second local BOC-like signal corresponding to the second step modulation symbol $d_2[0,1]$; and modulate the ranging code chip with each of the third step modulation symbol $d_3[j,0]$, the fourth step modulation symbol $d_4[0j]$, the fifth step modulation symbol $d_5[1,0,0,0,0,0,0,0,0,0,0,0]$, and the sixth step modulation symbol $d_6[0,0,0,0,0,0,0,0,0,0,0,1]$ to obtain the third local BOC-like signal corresponding to the third step modulation symbol $d_3[j,0]$, the fourth local BOC-like signal corresponding to the fourth step modulation symbol $d_4[0,j]$, the fifth local BOC-like signal corresponding to the fifth step modulation symbol $d_5[1,0,0,0,0,0,0,0,0,0,0,0]$, and the sixth local BOC-like signal corresponding to the sixth step modulation symbol $d_6[0,0,0,0,0,0,0,0,0,0,0,1]$.

As a further improvement, the cross-correlation result of the data channel includes a first cross-correlation result and a second cross-correlation result, and the cross-correlation result of the pilot channel includes a third cross-correlation result, a fourth cross-correlation result, a fifth cross-correlation result, and a sixth cross-correlation result. The linear operation unit is specifically configured to: perform, based on a first pseudo-correlation function, the linear operation on the first cross-correlation result and the second cross-correlation result through the pseudo-correlation function generator to eliminate the secondary peak in the cross-correlation result of the data channel and obtain the optimized cross-correlation result of the data channel, in which the first pseudo-correlation function is $R_b(\tau)=|R_{bb1}(\tau)|+|R_{bb2}(\tau)|-|R_{bb1}(\tau)+R_{bb2}(\tau)|$, where $R_b(\tau)$ represents the optimized cross-correlation result of the data channel, $R_{bb1}(\tau)$ represents the first cross-correlation result, and $R_{bb2}(\tau)$ represents the second cross-correlation result; and perform, based on a second pseudo-correlation function, the linear operation on the third cross-correlation result, the fourth cross-correlation result, the fifth cross-correlation result, and the sixth cross-correlation result through the pseudo-correlation function generator to eliminate the secondary peak in the cross-correlation result of the pilot channel and obtain the optimized cross-correlation result of the pilot channel, in which the second pseudo-correlation function is $R_Q(\tau)=|R_{Qb3}(\tau)|+|R_{Qb4}(\tau)|-|R_{Qb3}(\tau)+R_{Qb4}(\tau)|+|R_{Qb5}(\tau)|+|R_{Qb6}(\tau)|-|R_{Qb5}(\tau)+R_{Qb6}(\tau)|$, where $R_Q(\tau)$ represents the optimized cross-correlation result of the pilot channel, $R_{Qb3}(\tau)$ represents the third cross-correlation result, $R_{Qb4}(\tau)$ represents the fourth cross-correlation result, $R_{Qb5}(\tau)$ represents the fifth cross-correlation result, and $R_{Qb6}(\tau)$ represents the sixth cross-correlation result.

In the embodiments of the present disclosure, according to a pseudo-code characteristic of a BeiDou navigation satellite B1C signal, the local BOC-like signal is generated for each of the data channel and the pilot channel, and a pseudo-correlation function is constructed for a received signal and each of local signals, so as to solve a problem of ambiguity caused by the secondary peak, and capture satellite signals in a fast and effective manner, and finally, satellite signals are captured on the basis of the optimized cross-correlation result of the data channel and the optimized cross-correlation result of the pilot channel, thereby alleviating an existing technical problem of ambiguity in a signal capturing process resulted from multi-correlation secondary peaks of a pseudo-code correlation function for BeiDou navigation satellite B1C signals.

The embodiments of the present disclosure further provide a BeiDou navigation satellite B1C signal capturing device. The device includes a processor and a memory. The memory is configured to store program codes, and transmit the program codes to the processor. The processor is configured to implement, based on instructions in the program codes, the BeiDou navigation satellite B1C signal capturing method according to any one of the above method embodiments.

The embodiments of the present disclosure further provide a computer-readable storage medium. The computer-readable storage medium stores program codes. The program codes, when executed by a processor, implement the BeiDou navigation satellite B1C signal capturing method according to any one of the above method embodiments.

Those skilled in the art can clearly understand that, for convenience and brevity of description, a specific working process of the apparatus and units described above may refer to a corresponding process in the above method embodiments, and details thereof will be omitted here.

Terms "first", "second", "third", "fourth", and the like (if any), in the description of the present disclosure and the above figures are used to distinguish similar objects, and are not necessarily used to describe a specific order or sequence. It can be understood that data used in such a manner may be interchanged under appropriate circumstances, and thus the embodiments of the present disclosure described herein can, for example, be implemented in sequences other than those illustrated or described herein. In addition, terms "include", "have", and any variations thereof are intended to cover non-exclusive inclusions. For example, a process, method, system, product, or device that includes a series of steps or units is not necessarily limited to those clearly listed steps or units, but may also include other steps or units that are not clearly listed or are inherent to the process, method, product, or device.

It should be understood that, in the present disclosure, "at least one" refers to one or more, and "a plurality of" refers to two or more than two. "And/or" describes an association relationship between correlated objects, including three relationships. For example, "A and/or B" can mean A only, B only, or both A and B. Here, A and B can be singular or plural. The symbol "/" generally indicates an "or" relationship between the correlated objects preceding and succeeding the symbol. "At least one of the following items" or similar expressions refer to any combination of these items, including a single item or any combination of a plurality of items. For example, at least one of a, b, or c can represent a, b, c, "a and b", "a and c", "b and c", or "a, b, and c", where a, b, and c each can be singular or plural.

In the embodiments provided by the present disclosure, it should be understood that, the disclosed apparatus and method may be implemented in other ways. For example, the apparatus embodiments described above are merely illustrative. For example, the units are merely divided based on the logic functions, and they can be divided in other ways in actual implementations. For example, a plurality of units or components may be combined or may be integrated into another system, or some features may be omitted or not executed. In addition, the mutual coupling or direct coupling or communication connection between these units illustrated or discussed above may be via some interfaces, or the indirect coupling or communication connection between devices or units may be in an electrical, mechanical, or other manner.

The units described as separate parts may or may not be physically separated. Parts illustrated as units may or may not be physical units, i.e., the parts may be located in one place, or may be distributed on a plurality of network units. Some or all of the units can be selected according to actual needs to achieve objects of the solutions of the embodiments.

In addition, respective functional units in respective embodiments of the present disclosure may be integrated in one processing unit, or the respective units may be separate physical existence, or two or more units may be integrated in one unit. The above integrated units can be implemented in a form of hardware, or in a form of a functional software unit.

If the integrated units are realized in a form of functional software units and are sold or used as separate products, they can be stored in a computer-readable storage medium. Based on this understanding, essential parts of the technical solutions, parts making a contribution to the related art, or parts or all of the technical solutions of the present disclosure can be embodied in a form of a software product, which is stored in a storage medium, and includes several instructions used for causing a computer device (for example, a personal computer, a server, or a network device) to execute all or some of steps in the methods described in respective embodiments of the present disclosure. The above storage medium may be any medium capable of storing program codes, including a Universal Serial Bus (USB) flash disk, a mobile hard disk, a Read Only Memory (ROM), a Random Access Memory (RAM), a disc, or an optical disk.

As mentioned above, the above embodiments are only used to illustrate, rather than to limit, the technical solutions of the present disclosure. Although the present disclosure is described in detail with reference to the above embodiments, those skilled in the art should understand that modifications may be made to the technical solutions described in the above embodiments, or equivalent replacements may be made to some of the technical features of the technical solutions described in the above embodiments. However, these modifications or replacements do not cause a deviation of the essence of corresponding technical solutions from the spirit and scope of the technical solutions of the embodiments of the present disclosure.

What is claimed is:

1. A BeiDou navigation satellite B1C signal capturing method, comprising:
   mixing a digital intermediate frequency signal obtained from a received BeiDou navigation satellite B1C signal with a local intermediate frequency carrier signal to obtain a baseband signal;
   obtaining a local Binary Offset Carrier (BOC)-like signal on a data channel and a local BOC-like signal on a pilot channel through a ranging code chip and a step modulation symbol;
   processing the local BOC-like signal on the data channel and the local BOC-like signal on the pilot channel, performing a multiplication operation on the baseband signal after a fast Fourier transform and the processed local BOC-like signal on the data channel to obtain a first result, performing a multiplication operation on the baseband signal after a fast Fourier transform and the processed local BOC-like signal on the pilot channel to obtain a second result, and performing an inverse fast Fourier transform on the first result and the second result to obtain a cross-correlation result of the data channel and a cross-correlation result of the pilot channel;
   performing a linear operation on the cross-correlation result of the data channel and the cross-correlation result of the pilot channel through a pseudo-correlation function generator to eliminate secondary peaks in the cross-correlation results and obtain an optimized cross-correlation result of the data channel and an optimized cross-correlation result of the pilot channel; and
   capturing a satellite signal based on the optimized cross-correlation result of the data channel and the optimized cross-correlation result of the pilot channel, and outputting, after a success of the capturing, a code phase value corresponding to the ranging code chip and a Doppler frequency shift corresponding to the local intermediate frequency carrier signal.

2. The BeiDou navigation satellite B1C signal capturing method according to claim 1, wherein the step modulation symbol comprises a first step modulation symbol $d_1[1,0]$, a second step modulation symbol $d_2[0,1]$, a third step modulation symbol $d_3[j,0]$, a fourth step modulation symbol $d_4[0,j]$, a fifth step modulation symbol $d_5[1,0,0,0,0,0,0,0,0,0,0,0]$, and a sixth step modulation symbol $d_6[0,0,0,0,0,0,0,0,0,0,0,1]$, the local BOC-like signal on the data channel comprises a first local BOC-like signal and a second local BOC-like signal, and the local BOC-like signal on the pilot channel comprises a third local BOC-like signal, a fourth local BOC-like signal, a fifth local BOC-like signal, and a sixth local BOC-like signal; and
   said obtaining the local BOC-like signal on the data channel and the local BOC-like signal on the pilot channel through the ranging code chip and the step modulation symbol comprises:
   modulating the ranging code chip with each of the first step modulation symbol $d_1[1,0]$ and the second step modulation symbol $d_2[0,1]$ to obtain the first local BOC-like signal corresponding to the first step modulation symbol $d_1[1,0]$ and the second local BOC-like signal corresponding to the second step modulation symbol $d_2[0,1]$; and
   modulating the ranging code chip with each of the third step modulation symbol $d_3[j,0]$, the fourth step modulation symbol $d_4[0j]$, the fifth step modulation symbol $d_5[1,0,0,0,0,0,0,0,0,0,0,0]$, and the sixth step modulation symbol $d_6[0,0,0,0,0,0,0,0,0,0,0,1]$ to obtain the third local BOC-like signal corresponding to the third step modulation symbol $d_3[j,0]$, the fourth local BOC-like signal corresponding to the fourth step modulation symbol $d_4[0j]$, the fifth local BOC-like signal corresponding to the fifth step modulation symbol $d_5[1,0,0,0,0,0,0,0,0,0,0,0]$, and the sixth local BOC-like signal corresponding to the sixth step modulation symbol $d_6[0,0,0,0,0,0,0,0,0,0,0,1]$.

3. The BeiDou navigation satellite B1C signal capturing method according to claim 2, wherein the cross-correlation result of the data channel comprises a first cross-correlation result and a second cross-correlation result, and the cross-correlation result of the pilot channel comprises a third cross-correlation result, a fourth cross-correlation result, a fifth cross-correlation result, and a sixth cross-correlation result; and
   said performing the linear operation on the cross-correlation result of the data channel and the cross-correlation result of the pilot channel through the pseudo-correlation function generator to eliminate the secondary peaks in the cross-correlation results and obtain the optimized cross-correlation result of the data channel and the optimized cross-correlation result of the pilot channel comprises:
   performing, based on a first pseudo-correlation function, the linear operation on the first cross-correlation result and the second cross-correlation result through the pseudo-correlation function generator to eliminate the secondary peak in the cross-correlation result of the data channel and obtain the optimized cross-correlation result of the data channel, wherein the first pseudo-correlation function is:

$$R_b(\tau)=|R_{bb1}(\tau)|+|R_{bb2}(\tau)|-|R_{bb1}(\tau)+R_{bb2}(\tau)|,$$

where $R_b(\tau)$ represents the optimized cross-correlation result of the data channel, $R_{bb1}(\tau)$ represents the first cross-correlation result, and $R_{bb2}(\tau)$ represents the second cross-correlation result; and
   performing, based on a second pseudo-correlation function, the linear operation on the third cross-correlation result, the fourth cross-correlation result, the fifth cross-correlation result, and the sixth cross-correlation result through the pseudo-correlation function generator to eliminate the secondary peak in the cross-correlation result of the pilot channel and obtain the optimized cross-correlation result of the pilot channel, wherein the second pseudo-correlation function is:

$$R_Q(\tau)=|R_{Qb3}(\tau)|+|R_{Qb4}(\tau)|-|R_{Qb3}(\tau)+R_{Qb4}(\tau)|+|R_{Qb5}(\tau)|+|R_{Qb6}(\tau)|-|R_{Qb5}(\tau)+R_{Qb6}(\tau)|,$$

where $R_Q(\tau)$ represents the optimized cross-correlation result of the pilot channel, $R_{Qb3}(\tau)$ represents the third cross-correlation result, $R_{Qb4}(\tau)$ represents the fourth cross-correlation result, $R_{Qb5}(\tau)$ represents the fifth cross-correlation result, and $R_{Qb6}(\tau)$ represents the sixth cross-correlation result.

4. The BeiDou navigation satellite B1C signal capturing method according to claim 1, wherein a processing process of the local BOC-like signal on the data channel and the local BOC-like signal on the pilot channel comprises:
performing a fast Fourier transform and a conjugate processing on each of the local BOC-like signal on the data channel and the local BOC-like signal on the pilot channel to obtain the processed local BOC-like signal on the data channel and the processed local BOC-like signal on the pilot channel.

5. The BeiDou navigation satellite B1C signal capturing method according to claim 1, wherein said capturing the satellite signal based on the optimized cross-correlation result of the data channel and the optimized cross-correlation result of the pilot channel, and outputting, after the success of the capturing, the code phase value corresponding to the ranging code chip and the Doppler frequency shift corresponding to the local intermediate frequency carrier signal comprises:
performing an integral operation on each of the optimized cross-correlation result of the data channel and the optimized cross-correlation result of the pilot channel, and performing a differential coherent combination on an integration result of the data channel and an integration result of the pilot channel through a differential coherent integrator to obtain a differential coherent combination result; and
determining whether the differential coherent combination result is smaller than a threshold;
when the differential coherent combination result is smaller than the threshold, adjusting a carrier frequency of the local intermediate frequency carrier signal, and returning to the step of mixing the digital intermediate frequency signal obtained from the received BeiDou navigation satellite B1C signal with the local intermediate frequency carrier signal to obtain the baseband signal; and
when the differential coherent combination result is equal to or greater than the threshold, outputting the code phase value corresponding to the ranging code chip and the Doppler frequency shift corresponding to the local intermediate frequency carrier signal.

6. A BeiDou navigation satellite B1C signal capturing apparatus, comprising:
a mixing unit configured to mix a digital intermediate frequency signal obtained from a received BeiDou navigation satellite B1C signal with a local intermediate frequency carrier signal to obtain a baseband signal;
an obtaining unit configured to obtain a local Binary Offset Carrier (BOC)-like signal on a data channel and a local BOC-like signal on a pilot channel through a ranging code chip and a step modulation symbol;
a processing unit configured to process the local BOC-like signal on the data channel and the local BOC-like signal on the pilot channel, perform a multiplication operation on the baseband signal after a fast Fourier transform and the processed local BOC-like signal on the data channel to obtain a first result, perform a multiplication operation on the baseband signal after a fast Fourier transform and the processed local BOC-like signal on the pilot channel to obtain a second result, and perform an inverse fast Fourier transform on the first result and the second result to obtain a cross-correlation result of the data channel and a cross-correlation result of the pilot channel;
a linear operation unit configured to perform a linear operation on the cross-correlation result of the data channel and the cross-correlation result of the pilot channel through a pseudo-correlation function generator to eliminate secondary peaks in the cross-correlation results and obtain an optimized cross-correlation result of the data channel and an optimized cross-correlation result of the pilot channel; and
a capturing unit configured to capture a satellite signal based on the optimized cross-correlation result of the data channel and the optimized cross-correlation result of the pilot channel, and output, in response to the capturing being successful, a code phase value corresponding to the ranging code chip and a Doppler frequency shift corresponding to the local intermediate frequency carrier signal.

7. The BeiDou navigation satellite B1C signal capturing apparatus according to claim 6, wherein the step modulation symbol comprises a first step modulation symbol $d_1[1,0]$, a second step modulation symbol $d_2[0,1]$, a third step modulation symbol $d_3[j,0]$, a fourth step modulation symbol $d_4[0j]$, a fifth step modulation symbol $d_5[1,0,0,0,0,0,0,0,0,0,0,0]$, and a sixth step modulation symbol $d_6[0,0,0,0,0,0,0,0,0,0,0,1]$, the local BOC-like signal on the data channel comprises a first local BOC-like signal and a second local BOC-like signal, and the local BOC-like signal on the pilot channel comprises a third local BOC-like signal, a fourth local BOC-like signal, a fifth local BOC-like signal, and a sixth local BOC-like signal; and
the obtaining unit is configured to:
modulate the ranging code chip with each of the first step modulation symbol $d_1[1,0]$ and the second step modulation symbol $d_2[0,1]$ to obtain the first local BOC-like signal corresponding to the first step modulation symbol $d_1[1,0]$ and the second local BOC-like signal corresponding to the second step modulation symbol $d_2[0,1]$; and
modulate the ranging code chip with each of the third step modulation symbol $d_3[j,0]$, the fourth step modulation symbol $d_4[0j]$, the fifth step modulation symbol $d_5[1,0,0,0,0,0,0,0,0,0,0]$, and the sixth step modulation symbol $d_6[0,0,0,0,0,0,0,0,0,0,0,1]$ to obtain the third local BOC-like signal corresponding to the third step modulation symbol $d_3[j,0]$, the fourth local BOC-like signal corresponding to the fourth step modulation symbol $d_4[0j]$, the fifth local BOC-like signal corresponding to the fifth step modulation symbol $d_5[1,0,0,0,0,0,0,0,0,0,0]$, and the sixth local BOC-like signal corresponding to the sixth step modulation symbol $d_6[0,0,0,0,0,0,0,0,0,0,0,1]$.

8. The BeiDou navigation satellite B1C signal capturing apparatus according to claim 7, wherein the cross-correlation result of the data channel comprises a first cross-correlation result and a second cross-correlation result, and the cross-correlation result of the pilot channel comprises a third cross-correlation result, a fourth cross-correlation result, a fifth cross-correlation result, and a sixth cross-correlation result; and the linear operation unit is configured to:

perform, based on a first pseudo-correlation function, the linear operation on the first cross-correlation result and the second cross-correlation result through the pseudo-correlation function generator to eliminate the secondary peak in the cross-correlation result of the data channel and obtain the optimized cross-correlation result of the data channel, wherein the first pseudo-correlation function is:

$$R_b(\tau)=|R_{bb1}(\tau)|+|R_{bb2}(\tau)|-|R_{bb1}(\tau)+R_{bb2}(\tau)|,$$

where $R_b(\tau)$ represents the optimized cross-correlation result of the data channel, $R_{bb1}(\tau)$ represents the first cross-correlation result, and $R_{bb2}(\tau)$ represents the second cross-correlation result; and perform, based on a second pseudo-correlation function, the linear operation on the third cross-correlation result, the fourth cross-correlation result, the fifth cross-correlation result, and the sixth cross-correlation result through the pseudo-correlation function generator to eliminate the secondary peak in the cross-correlation result of the pilot channel and obtain the optimized cross-correlation result of the pilot channel, wherein the second pseudo-correlation function is:

$$R_Q(\tau)=|R_{Qb3}(\tau)|+|R_{Qb4}(\tau)|-|R_{Qb3}(\tau)+R_{Qb4}(\tau)|+|R_{Qb5}(\tau)|+|R_{Qb6}(\tau)|-|R_{Qb5}(\tau)+R_{Qb6}(\tau)|,$$

where $R_Q(i)$ represents the optimized cross-correlation result of the pilot channel, $R_{Qb3}(\tau)$ represents the third cross-correlation result, $R_{Qb4}(\tau)$ represents the fourth cross-correlation result, $R_{Qb5}(\tau)$ represents the fifth cross-correlation result, and $R_{Qb6}(\tau)$ represents the sixth cross-correlation result.

9. A BeiDou navigation satellite B1C signal capturing device, comprising a processor and a memory, wherein
the memory is configured to store program codes, and transmit the program codes to the processor; and
the processor is configured to implement, based on instructions in the program codes, a BeiDou navigation satellite B1C signal capturing method, comprising:
mixing a digital intermediate frequency signal obtained from a received BeiDou navigation satellite B1C signal with a local intermediate frequency carrier signal to obtain a baseband signal;
obtaining a local Binary Offset Carrier (BOC)-like signal on a data channel and a local BOC-like signal on a pilot channel through a ranging code chip and a step modulation symbol;
processing the local BOC-like signal on the data channel and the local BOC-like signal on the pilot channel, performing a multiplication operation on the baseband signal after a fast Fourier transform and the processed local BOC-like signal on the data channel to obtain a first result, performing a multiplication operation on the baseband signal after a fast Fourier transform and the processed local BOC-like signal on the pilot channel to obtain a second result, and performing an inverse fast Fourier transform on the first result and the second result to obtain a cross-correlation result of the data channel and a cross-correlation result of the pilot channel;
performing a linear operation on the cross-correlation result of the data channel and the cross-correlation result of the pilot channel through a pseudo-correlation function generator to eliminate secondary peaks in the cross-correlation results and obtain an optimized cross-correlation result of the data channel and an optimized cross-correlation result of the pilot channel; and
capturing a satellite signal based on the optimized cross-correlation result of the data channel and the optimized cross-correlation result of the pilot channel, and outputting, after a success of the capturing, a code phase value corresponding to the ranging code chip and a Doppler frequency shift corresponding to the local intermediate frequency carrier signal.

10. The BeiDou navigation satellite B1C signal capturing device according to claim 9, wherein the step modulation symbol comprises a first step modulation symbol $d_1[1,0]$, a second step modulation symbol $d_2[0,1]$, a third step modulation symbol $d_3[j,0]$, a fourth step modulation symbol $d_4[0j]$, a fifth step modulation symbol $d_5[1,0,0,0,0,0,0,0,0,0,0,0]$, and a sixth step modulation symbol $d_6[0,0,0,0,0,0,0,0,0,0,0,1]$, the local BOC-like signal on the data channel comprises a first local BOC-like signal and a second local BOC-like signal, and the local BOC-like signal on the pilot channel comprises a third local BOC-like signal, a fourth local BOC-like signal, a fifth local BOC-like signal, and a sixth local BOC-like signal; and said obtaining the local BOC-like signal on the data channel and the local BOC-like signal on the pilot channel through the ranging code chip and the step modulation symbol comprises:
modulating the ranging code chip with each of the first step modulation symbol $d_1[1,0]$ and the second step modulation symbol $d_2[0,1]$ to obtain the first local BOC-like signal corresponding to the first step modulation symbol $d_1[1,0]$ and the second local BOC-like signal corresponding to the second step modulation symbol $d_2[0,1]$; and
modulating the ranging code chip with each of the third step modulation symbol $d_3[j,0]$, the fourth step modulation symbol $d_4[0,j]$, the fifth step modulation symbol $d_5[1,0,0,0,0,0,0,0,0,0,0,0]$, and the sixth step modulation symbol $d_6[0,0,0,0,0,0,0,0,0,0,0,1]$ to obtain the third local BOC-like signal corresponding to the third step modulation symbol $d_3[j,0]$, the fourth local BOC-like signal corresponding to the fourth step modulation symbol $d_4[0,j]$, the fifth local BOC-like signal corresponding to the fifth step modulation symbol $d_5[1,0,0,0,0,0,0,0,0,0,0]$, and the sixth local BOC-like signal corresponding to the sixth step modulation symbol $d_6[0,0,0,0,0,0,0,0,0,0,0,1]$.

11. The BeiDou navigation satellite B1C signal capturing device according to claim 10, wherein the cross-correlation result of the data channel comprises a first cross-correlation result and a second cross-correlation result, and the cross-correlation result of the pilot channel comprises a third cross-correlation result, a fourth cross-correlation result, a fifth cross-correlation result, and a sixth cross-correlation result; and said performing the linear operation on the cross-correlation result of the data channel and the cross-correlation result of the pilot channel through the pseudo-correlation function generator to eliminate the secondary peaks in the cross-correlation results and obtain the optimized cross-correlation result of the data channel and the optimized cross-correlation result of the pilot channel comprises:
performing, based on a first pseudo-correlation function, the linear operation on the first cross-correlation result and the second cross-correlation result through the pseudo-correlation function generator to eliminate the secondary peak in the cross-correlation result of the data channel and obtain the optimized cross-correlation result of the data channel, wherein the first pseudo-correlation function is:

$R_b(\tau)=|R_{bb1}(\tau)|+|R_{bb2}(\tau)|-|R_{bb1}(\tau)+R_{bb2}(\tau)|,$ where $R_b(i)$ represents the optimized cross-correlation result of the data channel, $R_{bb1}(\tau)$ represents the first cross-correlation result, and $R_{bb2}(\tau)$ represents the second cross-correlation result; and performing, based on a second pseudo-correlation function, the linear operation on the third cross-correlation result, the fourth cross-correlation result, the fifth cross-correlation result, and the sixth cross-correlation result through the pseudo-correlation function generator to eliminate the secondary peak in the cross-correlation result of the pilot channel and obtain the optimized cross-correlation result of the pilot channel, wherein the second pseudo-correlation function is:

$R_Q(\tau)=|R_{Qb3}(\tau)|+|R_{Qb4}(\tau)|-|R_{Qb3}(\tau)+R_{Qb4}(\tau)|+|R_{Qb5}(\tau)|+|R_{Qb6}(\tau)|-|R_{Qb5}(\tau)+R_{Qb6}(\tau)|,$ where $R_Q(\tau)$ represents the optimized cross-correlation result of the pilot channel, $R_{Qb3}(\tau)$ represents the third cross-correlation result, $R_{Qb4}(\tau)$ represents the fourth cross-correlation result, $R_{Qb5}(\tau)$ represents the fifth cross-correlation result, and $R_{Qb6}(\tau)$ represents the sixth cross-correlation result.

12. The BeiDou navigation satellite B1C signal capturing device according to claim 9, wherein a processing process of the local BOC-like signal on the data channel and the local BOC-like signal on the pilot channel comprises:

performing a fast Fourier transform and a conjugate processing on each of the local BOC-like signal on the data channel and the local BOC-like signal on the pilot channel to obtain the processed local BOC-like signal on the data channel and the processed local BOC-like signal on the pilot channel.

13. The BeiDou navigation satellite B1C signal capturing device according to claim 9, wherein said capturing the satellite signal based on the optimized cross-correlation result of the data channel and the optimized cross-correlation result of the pilot channel, and outputting, after the success of the capturing, the code phase value corresponding to the ranging code chip and the Doppler frequency shift corresponding to the local intermediate frequency carrier signal comprises:

performing an integral operation on each of the optimized cross-correlation result of the data channel and the optimized cross-correlation result of the pilot channel, and performing a differential coherent combination on an integration result of the data channel and an integration result of the pilot channel through a differential coherent integrator to obtain a differential coherent combination result; and determining whether the differential coherent combination result is smaller than a threshold;

when the differential coherent combination result is smaller than the threshold, adjusting a carrier frequency of the local intermediate frequency carrier signal, and returning to the step of mixing the digital intermediate frequency signal obtained from the received BeiDou navigation satellite B1C signal with the local intermediate frequency carrier signal to obtain the baseband signal; and when the differential coherent combination result is equal to or greater than the threshold, outputting the code phase value corresponding to the ranging code chip and the Doppler frequency shift corresponding to the local intermediate frequency carrier signal.

14. A non-transitory computer-readable storage medium, having program codes stored thereon, wherein the program codes, when executed by a processor, implement the BeiDou navigation satellite B1C signal capturing method according to claim 1.

15. The non-transitory computer-readable storage medium according to claim 14, wherein the step modulation symbol comprises a first step modulation symbol $d_1[1,0]$, a second step modulation symbol $d_2[0,1]$, a third step modulation symbol $d_3[j,0]$, a fourth step modulation symbol $d_4[0j]$, a fifth step modulation symbol $d_5[1,0,0,0,0,0,0,0,0,0,0,0]$, and a sixth step modulation symbol $d_6[0,0,0,0,0,0,0,0,0,0,0,1]$, the local BOC-like signal on the data channel comprises a first local BOC-like signal and a second local BOC-like signal, and the local BOC-like signal on the pilot channel comprises a third local BOC-like signal, a fourth local BOC-like signal, a fifth local BOC-like signal, and a sixth local BOC-like signal; and said obtaining the local BOC-like signal on the data channel and the local BOC-like signal on the pilot channel through the ranging code chip and the step modulation symbol comprises:

modulating the ranging code chip with each of the first step modulation symbol $d_1[1,0]$ and the second step modulation symbol $d_2[0,1]$ to obtain the first local BOC-like signal corresponding to the first step modulation symbol $d_1[1,0]$ and the second local BOC-like signal corresponding to the second step modulation symbol $d_2[0,1]$; and modulating the ranging code chip with each of the third step modulation symbol $d_3[j,0]$, the fourth step modulation symbol $d_4[0j]$, the fifth step modulation symbol $d_5[1,0,0,0,0,0,0,0,0,0,0,0]$, and the sixth step modulation symbol $d_6[0,0,0,0,0,0,0,0,0,0,0,1]$ to obtain the third local BOC-like signal corresponding to the third step modulation symbol $d_3[j,0]$, the fourth local BOC-like signal corresponding to the fourth step modulation symbol $d_4[0j]$, the fifth local BOC-like signal corresponding to the fifth step modulation symbol $d_5[1,0,0,0,0,0,0,0,0,0,0,0]$, and the sixth local BOC-like signal corresponding to the sixth step modulation symbol $d_6[0,0,0,0,0,0,0,0,0,0,0,1]$.

16. The non-transitory computer-readable storage medium according to claim 15, wherein the cross-correlation result of the data channel comprises a first cross-correlation result and a second cross-correlation result, and the cross-correlation result of the pilot channel comprises a third cross-correlation result, a fourth cross-correlation result, a fifth cross-correlation result, and a sixth cross-correlation result; and said performing the linear operation on the cross-correlation result of the data channel and the cross-correlation result of the pilot channel through the pseudo-correlation function generator to eliminate the secondary peaks in the cross-correlation results and obtain the optimized cross-correlation result of the data channel and the optimized cross-correlation result of the pilot channel comprises:

performing, based on a first pseudo-correlation function, the linear operation on the first cross-correlation result and the second cross-correlation result through the pseudo-correlation function generator to eliminate the secondary peak in the cross-correlation result of the data channel and obtain the optimized cross-correlation result of the data channel, wherein the first pseudo-correlation function is:

$$R_b(\tau)=|R_{bb1}(\tau)|+|R_{bb2}(\tau)|-|R_{bb1}(\tau)+R_{bb2}(\tau)|,$$

where $R_b(\tau)$ represents the optimized cross-correlation result of the data channel, $R_{bb1}(\tau)$ represents the first cross-correlation result, and $R_{bb2}(\tau)$ represents the second cross-correlation result; and performing, based on a second pseudo-correlation function, the linear operation on the third cross-correlation result, the fourth cross-correlation result, the fifth cross-correlation result, and the sixth cross-correlation result through the pseudo-correlation function generator to eliminate the secondary peak in the cross-correlation result of the pilot channel and obtain the optimized cross-correlation result of the pilot channel, wherein the second pseudo-correlation function is:

$$R_Q(\tau)=|R_{Qb3}(\tau)|+|R_{Qb4}(\tau)|-|R_{Qb3}(\tau)+R_{Qb4}(\tau)|+|R_{Qb5}(\tau)|+|R_{Qb6}(\tau)|-|R_{Qb5}(\tau)+R_{Qb6}(\tau)|,$$

where $R_Q(\tau)$ represents the optimized cross-correlation result of the pilot channel, $R_{Qb3}(\tau)$ represents the third cross-correlation result, $R_{Qb4}(\tau)$ represents the fourth cross-correlation result, $R_{Qb5}(\tau)$ represents the fifth cross-correlation result, and $R_{Qb6}(\tau)$ represents the sixth cross-correlation result.

17. The non-transitory computer-readable storage medium according to claim 14, wherein a processing process of the local BOC-like signal on the data channel and the local BOC-like signal on the pilot channel comprises:
   performing a fast Fourier transform and a conjugate processing on each of the local BOC-like signal on the data channel and the local BOC-like signal on the pilot channel to obtain the processed local BOC-like signal on the data channel and the processed local BOC-like signal on the pilot channel.

18. The non-transitory computer-readable storage medium according to claim 14, wherein said capturing the satellite signal based on the optimized cross-correlation result of the data channel and the optimized cross-correlation result of the pilot channel, and outputting, after the success of the capturing, the code phase value corresponding to the ranging code chip and the Doppler frequency shift corresponding to the local intermediate frequency carrier signal comprises:
   performing an integral operation on each of the optimized cross-correlation result of the data channel and the optimized cross-correlation result of the pilot channel, and performing a differential coherent combination on an integration result of the data channel and an integration result of the pilot channel through a differential coherent integrator to obtain a differential coherent combination result; and
   determining whether the differential coherent combination result is smaller than a threshold;
      when the differential coherent combination result is smaller than the threshold, adjusting a carrier frequency of the local intermediate frequency carrier signal, and returning to the step of mixing the digital intermediate frequency signal obtained from the received BeiDou navigation satellite B1C signal with the local intermediate frequency carrier signal to obtain the baseband signal; and
   when the differential coherent combination result is equal to or greater than the threshold, outputting the code phase value corresponding to the ranging code chip and the Doppler frequency shift corresponding to the local intermediate frequency carrier signal.

\* \* \* \* \*